Jan. 1, 1974 T. M. SMITH 3,782,980
REFRACTORY POURING TUBE
Filed Feb. 16, 1972
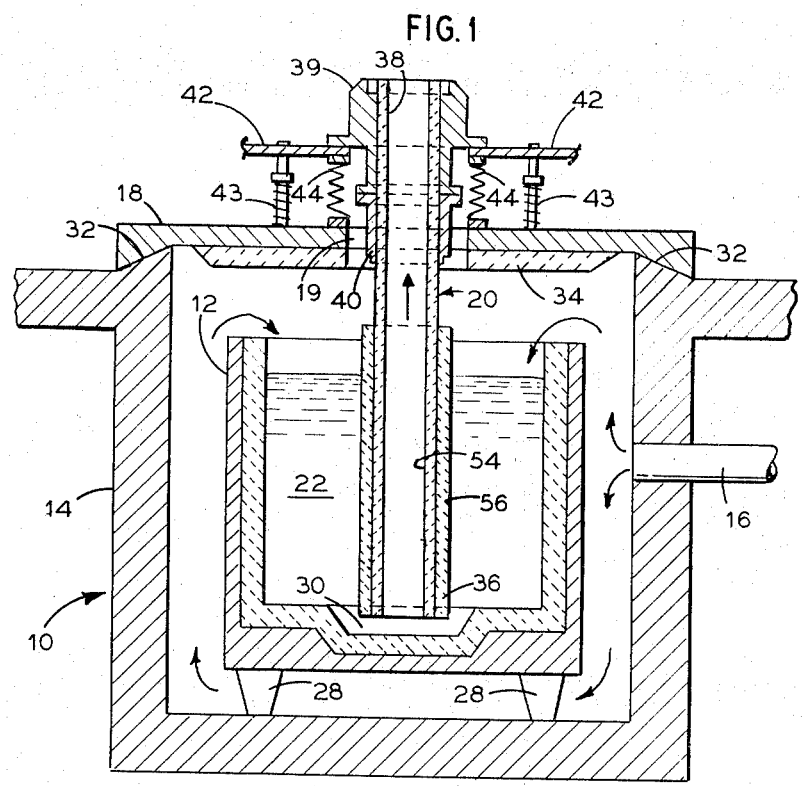
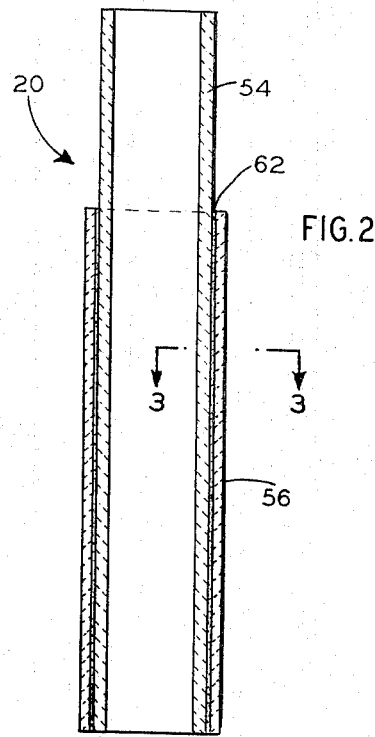
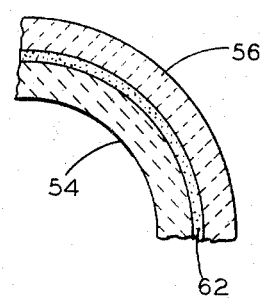
INVENTOR.
Terrance M. Smith
BY
ATTORNEY

United States Patent Office 3,782,980
Patented Jan. 1, 1974

---

3,782,980
REFRACTORY POURING TUBE
Terrance M. Smith, Augusta, Ga., assignor to The Babcock & Wilcox Company, New York, N.Y.
Continuation-in-part of abandoned application Ser. No. 22,461, Mar. 25, 1970. This application Feb. 16, 1972, Ser. No. 226,994
Int. Cl. C04b 35/18, 35/48
U.S. Cl. 106—57                4 Claims

ABSTRACT OF THE DISCLOSURE

There is provided a fired refractory article composed of a fused refractory aggregate and a refractory binder material for bonding the aggregate together. The aggregate consists essentially of (by weight) about 42–48 percent alumina ($Al_2O_3$) and about 17–23 percent silica ($SiO_2$) generally in the form of mullite crystals ($3Al_2O_3$—$2SiO_2$), and about 33–39 percent unstabilized zirconia ($ZrO_2$) dispersed throughout the mullite structure.

The aggregate forms 50 to 80% while the binder forms 50 to 20% of the refractory article. The binder originally contains 10 to 90% of 100 mesh zircon sand, 10 to 90% 325 mesh alumina and 0 to 50% raw clay. In addition suitable plasticizers and organic materials are added for forming purpose and are eliminated during heat treatment of the article.

---

This application is a continuation-in-part of my application Ser. No. 22,461, filed Mar. 25, 1970, now abandoned.

The invention relates generally to a composition and method for making refractory articles and more particularly to a composition and method of making refractory pouring tubes of the type employed in pressure casting molten metals.

As is well known, controlled pressure pouring is a direct method of casting slabs from a ladle containing molten metal. A cap for sealing the open top of the ladle, or for sealing a container holding the ladle, is provided with a vertically extending, refractory pouring tube. The tube is arranged with the inlet or lower end of the tube immersed in the melt and with the upper end of the tube extending through the cap. Superatmospheric gaseous pressure applied to the surface of the melt forces the molten metal upwardly through the pouring tube for discharge into a mold.

The success of this pressure pouring method depends for efficiency and economy in no small measure on the durability and dependability of the pressure pouring tube. It is therefore a principal object of the present invention to provide a long-lasting refractory pouring tube which can be used for many heats to pour a large number of slabs before it must be replaced.

Ideally, a pressure pouring tube has a wall of dense, impermeable construction in order to resist flow therethrough of the pressurized air or gas used to force molten metal up the tube. In addition, the tube should be capable of withstanding not only the thermal shock of immersion in 2950° F. molten steel, but also chemical attack from hot slag on its exterior surface, as well as erosion of its internal surface from the flow of hot metal therethrough. Pressure pouring tubes manufactured in accordance with this invention exhibit these desirable characteristics.

According to the present invention fired refractory articles, such as pressure pouring tubes, are composed of a fused refractory aggregate and a refractory binder material for bonding the aggregate together. The aggregate consists essentially of (by weight) about 42–48 percent alumina ($Al_2O_3$) and about 17–23 percent silica ($SiO_2$) generally in the form of mullite crystals ($3Al_2O_3$—$2SiO_2$), and about 33–39 percent unstabilized zirconia ($ZrO_2$) dispersed throughout the mullite structure.

Additionally, there is provided a method for manufacturing a fired refractory article, such as a pressure pouring tube. The process includes mixing an aggregate consisting essentially of (by weight) 42–48 percent alumina, 17–23 percent silica, and 33–39 percent unstabilized monoclinic zirconia with a refractory binder, molding the aggregate and binder material to form the article, and firing the article.

FIG. 1 is a vertical sectional view of a pressure pouring apparatus incorporating a pressure pouring tube constructed in accordance with the present invention;

FIG. 2 is an enlarged view of the pressure pouring tube of FIG. 1; and

FIG. 3 is an enlarged, horizontal sectional view of a portion of the pressure pouring tube of FIG. 2, taken along line 3—3 of FIG. 2.

As shown in FIG. 1, a pressure pouring apparatus incorporating the invention may comprise an airtight container 10 for ladle 12, the container including a vessel body 14 provided with a pressurized air inlet 16 and also a cover 18 having a central hole 19 fitted with a refractory tube 20. The latter serves to conduct molten metal 22 under superatmospheric gaseous pressure, e.g. 60 p.s.i., upwardly from the bottom of the ladle 12 through a suitable gate and passageway (not shown) to a mold (also not shown). It is the application of gas pressure to the surface of the melt 22 that forces molten metal up the tube 20 in the direction of the arrow and into the mold.

The body 14 of the container 10 may be made of concrete and/or steel and of sufficient size to receive the ladle 12 therein on supporting legs 28, with generous clearance on all sides of the ladle. Molten metal 22 may be supplied to the ladle 12 from one or more furnaces (not shown). The ladle 12 may be made of refractory and steel material in any suitable vessel shape which is open at the top, preferably with a sump 30 formed in the bottom thereof to provide a point from which molten metal may be withdrawn from the ladle 12.

The mutually facing surfaces 32 of the body 14 and the cover 18 are preferably frusto conical in order that the cover 18 will seat centrally on the body 14 in sealing relationship. In addition, an underside portion of the cover 18 positioned above the open top of the ladle 12 has a suitable insulating refractory lining 34. Carried upright by a centrally apertured portion of the cover 18 is the pressure pouring tube 20, with its lower or inlet end 36 being adapted for reception in the sump 30 and its upper or outlet end 38 extending upwardly through and beyond the cover 18, as shown.

As shown in FIG. 1, the tube 20 depends from a tubular pouring head 39 and a tubular holder 40. The latter two parts 39 and 40 are attached together in axial alignment and they are carried on a supporting plate 42 which, in turn rests on the cover 18 through resilient members 43. Further provided is a metal bellows type of expansion joint 44 which effects a seal between the cover 18 and the pouring head 19, thereby maintaining air or gas pressure within the container 10 despite the hole 19 in the cover 18. A refractory mortar composition, poured into a tapered annular space between the tube 20 and the assembly of the head 39 and the holder 40, adheres to the outer surface of the tube 20 so that the assembly holds the tube 20 against downward movement.

A plurality of molds may be used one after the other for pouring slabs by the introduction of molten metal thereto through a mold gate movable for controlling the flow of discharged molten metal from the tube outlet 38. Opening the mold gate admits molten metal under pressure to the mold cavity until it is filled, after which the gate is closed to prevent further flow of molten metal into the mold cavity. Simultaneously with the closing of the mold, gate pressure is preferably reduced in the container 10 until the next mold is positioned and ready to be poured.

In one embodiment, the pressure pouring tube of the present invention is of the monolithic type composed of a fused refractory aggregate and a binder material for bonding the aggregate together. The fused refractory aggregate consists essentially (by weight) of about 42%–48% $Al_2O_3$ and about 17%–23% $SiO_2$ generally in the form of a mullite ($3Al_2O_3$—$2SiO_2$) matrix, and about 33%–39% unstabilized $ZrO_2$ dispersed throughout the mullite matrix. It is desirable that the crystalline structure of the aggregate consist of about 61%–67% mullite and about 33%–39% unstabilized zirconia and preferably the structure is 64% mullite and 36% unstabilized zirconia. The binder is one which is resistant to the molten metal and may be of the type hereinafter disclosed.

In another embodiment, as shown in FIGS. 1 and 2, the pouring tube 20 is of the composite type described in U.S. application, Ser. No. 790,712, filed Jan. 13, 1969 now U.S. Pat. 3,529,753 which includes inner and outer tubular members 54 and 56 respectively, both members being composed of a refractory material and joined by an annular mortar joint 62. According to this invention both tubular members may be composed of the refractory composition previously described, however it is preferred for economic reasons that the inner and outer tubular members 54 and 56 have dissimilar chemical compositions, the inner being the novel refractory material previously described and the outer being of a less expensive refractory material resistant to slag attack and thermal shock.

The monolithic tube and inner tubular member 54 of the preferred embodiment may be made in the same general way.

The first step in the process of manufacturing a tubular member having the novel composition involves the forming of the aggregate. In one method a mixture of about 45% alumina and about 55% zircon sand are fused at a temperature of about 3300° F–3600° F. in a large vessel with a submerged carbon arc. During the fusion process, the alumina and the silica from the zircon sand combine to form mullite, leaving unstabilized zirconia finely dispersed throughout the mullite structure. It will be understood from the nature of the system that while alumina and zircon sand have been selected as the raw materials for economic reasons, any raw materials which yield a mixture having a composition chemically equivalent to about 42–48 percent $Al_2O_3$, 17–23 percent $SiO_2$ and 33–39 percent $ZrO_2$ are acceptable.

It is important that the impurities in the initial ingredients be kept at a minimum as this reduces the possibility of the product having an unacceptable glassy matrix susceptible to corrosion. Furthermore, high purity insures that the zirconia is retained in its unstabilized condition with its characteristic reversible crystal transformation from the monoclinic form to the tetragonal form at about 1800° F. It is this transformation with its related shrinkage which limits the total thermal expansion of the tubular member during immersion into the melt and thereby improves its thermal shock resistance. Because of the requirement of purity it has been found desirable to use a grade of alumina which is about 99% pure $Al_2O_3$, e.g., A-1 Alumina, zircon sand having the following composition (by weight) has been found acceptable:

| | Percent |
|---|---|
| $ZrO_2$ | 65.0 |
| $SiO_2$ | 34.0 |
| $TiO_2$ | 0.2 |
| $Fe_2O_3$ | Trace |
| $Al_2O_3$ | 0.8 |

The particle size of the raw materials is important in that it affects the rate of the reaction. Zircon sand having the following Tyler screen tabulation (cumulative wt. percent):

| | |
|---|---|
| +100 mesh | 10.1 |
| −100+140 mesh | 62.0 |
| −140+200 mesh | 97.6 |
| −200+270 mesh | 99.2 |
| −270 mesh | 100.0 | has been found acceptable, as has alumina having the following Tyler screen tabulation (wt. percent):

| | |
|---|---|
| +100 mesh | 4–15 |
| +200 mesh | 50–75 |
| +325 mesh | 88–98 |
| −325 mesh | 2–12 |

After adequate reaction time at the elevated temperature which in the above case is about an hour, the mixture is allowed to cool to form an ingot. The chemical composition of the ingot should be within the following ranges (wt. percent):

| | |
|---|---|
| $Al_2O_3$ | 42–48 |
| $ZrO_2$ | 33–39 |
| $SiO_2$ | 17–23 |
| Others | 0–2 | and preferably the composition will be 36% unstabilized zirconia, and 45% alumina and 19% silica in the form of mullite.

Following cooling, the ingot is crushed in a conventional manner and the resulting aggregate screened to yield a desired size distribution. Size distribution of the aggregate is important in that it affects the tube forming process and the strength characteristics of the fired tube. The aggregate preferably has a Tyler screen tabulation (cummulative wt. percent) as follows:

| | |
|---|---|
| 6 mesh | 0.2 |
| 8 mesh | 10–15 |
| 10 mesh | 24–30 |
| 14 mesh | 34–45 |
| 20 mesh | 50–60 |
| 28 mesh | 60–70 |
| −28 mesh | 100 |

A number of binder materials which are resistant to molten metal are acceptable, however a desirable binder material is generally composed of zircon sand, alumina, and clay. The chemical composition of the mix and the particle sizes of the components are for the most part chosen by balancing the most favorable fired properties with forming ease. The alumina may be −325 mesh alumina and the zircon sand may have a screen curve similar to the zircon sand used in forming the aggregate.

In forming the product an aggregate of 80 to 50% by weight is mixed with a refractory binder material consisting of 20 to 50% by weight. The binder for bonding the aggregate together consisting of −100 mesh zircon sand, −325 mesh alumina and clay. These binder materials may be combined according to the ratio −100 mesh zircon sand 10–90%, −325 mesh alumina, 10–90% and raw clay 0–50%.

For example, an 80% aggregate 20% bond phase product having 50% alumina, 30% zircon, 20% clay in the binder would have a formulation as follows:

| | |
|---|---|
| Aggregate | 80%. |
| −325M Alumina | 10% (50% x 20%). |
| −100M Zircon | 6% (30% x 20%). |
| Clay | 4% (20% x 20%). |

With a 90% zircon 10% clay bond the formulation would be as follows:

| | |
|---|---|
| Aggregate | 80%. |
| −100M Zircon | 18% (90% x 20%). |
| Clay | 2% (10% x 20%). |

The aggregate acts as the backbone of the body limiting shrinkage during firing. Furthermore, it improves the thermal shock resistance of the fired tube, exhibits excellent resistance to the corrosive effect of molten steel, and is dense, hard, strong and abrasive resistant. The zircon sand and alumina fill the need for intermediate sized grains to improve the rammability of the mix. During firing these react to form a ceramic bond including some mullite. The pulverized kaolin and bentonite act as plasticizers imparting green strength to the rammed tube and on firing form a ceramic bond with other bond constituents and the aggregate. Additive A and Nalco 101, manufactured by Kimberly Clark and Nalco Chemical Company respectively, are organic binders used to lubricate the mix improving rammability and green strength. On firing they burn out completely as does the kerosene which acts as a lubricant to improve the flow of the mix from the hopper to the mold. Water is used to temper the mix to the proper ramming consistency, the water of course evaporates on firing.

While the above mix is desirable if ramming is the forming method to be employed, the above mix may be varied considerably if another forming method is preferred or even if the ramming technique is used.

Chemically the binder need not be as pure as the ingredients used in forming the aggregate since the tube is not fired to the fusion temperature but rather sintered. Furthermore, it is not absolutely necessary that both zircon sand and alumina be present as acceptable tubes have been formed using a binder material having no zircon sand or on the other hand no alumina. Also zircon sand could be replaced by zirconia. Clay, or an organic or polymeric binder and plasticizer, of course, should always be employed to impart plasticity to the mix. The aggregate may range from about 50 to about 80 percent. If the aggregate composition is less than this range the unstabilized zirconia content of the tube may not be sufficient to supply acceptable thermal shock characteristics; on the other hand, if it is greater, the size changes of the tube due to zirconia crystal transformation may be so great as to crack the tube.

The particle size employed is really a balance of desired fired properties with forming ease. The finer the particles the stronger the tube, however some coarse particles are necessary for ramming. For ramming the particle size distribution is preferably about 40% coarse, 30% intermediate and about 30% fine.

With relation to a preferred mix, the density of the mix generally varies directly as the amount of zircon sand increases at the expense of the alumina. Also, an increase in zircon sand produces a grainy mix with poor green strength. On the other hand, an increase in alumina content at the expense of zircon sand yields a powdery mixture which is fine and sticks to the mold.

After the tube is formed the mold is removed and the tube is allowed to dry several days before firing. Firing is conducted over a period of about 72 hours. During the first 24 hours the tube is slowly raised from ambient temperature to about 2700° F. During the next 12 hours it is held at that temperature and then during the following 36 hours slowly returned to ambient temperature.

If the conventional ramming technique is to be used as the forming method, a preferred aggregate-binder mixture (wt. percent±1%) includes the following:

| | |
|---|---|
| Aggregate | 64 |
| Zircon sand | 14 |
| Alumina | 13 |
| Pulverized kaolin | 8 |
| Bentonite | 1 |
| Additive A | +1 |
| Nalco 101 | +0.25 |
| Kerosene | +0.25 |
| Water | +4 |

Those ingredients having a "+" sign before the number burn out on firing as hereinafter explained, and their weight percent is based on the total weight of those ingredients not having a "+" sign.

During firing the aggregate is not mineralogically changed. The reactions in the binder material are complex and not fully understood; with the above mix, however, the chemistry of the binder material in the fired tube is as follows:

| | Percent |
|---|---|
| $ZrO_2$ | 25 |
| $Al_2O_3$ | 47 |
| $SiO_2$ | 28 |

Some of the physical properties of a tube formed in the above described manner include:

| | |
|---|---|
| Density | 180 p.c.f. |
| Modulus of rupture | 1500 p.s.i. |
| Thermal shock | 50–60% MOE retained. |
| Porosity | 18%. |
| Fusion point | 3200° F. |

If the pouring tube is to be of the monolithic type the pouring tube is of course ready for use at this point. It is, however, preferred that the teachings of U.S. application Serial No. 790,712, filed January 13, 1969 now U.S. Patent 3,529,753 be followed, i.e. that a second refractory tube be mortared to the outside of a tube formed by the previously described process. The mortar disclosed in that application is acceptable. This outer tube may be another tube formed in the previously described manner or any other refractory tube resistant to slag corrosions. It is preferred for economic reasons that a tube of the type described as the outer tube in said U.S. patent.

While this invention has been described with reference to pressure pouring tubes, it should be understood that other refractory articles may be made from this composition.

What is claimed is:

1. A fired refractory article characterized by a composition consisting of 50%–80% by weight of a crushed fused refractory aggregate consisting essentially chemically by weight of about 42–48 percent alumina and 17–23 percent silica generally in the form of mullite, and about 33–39 percent unstabilized zirconia; and a refractory binder material consisting of 50%–20% by weight of the article for bonding the aggregate together, said binder before firing consisting essentially of 100 mesh zircon sand 10 to 90%, 325 mesh alumina 10 to 90% and clay 0 to 50% with organic lubricating materials thermally removed during firing.

2. The refractory article of claim 1, wherein the crystaline structure of the aggregate includes by weight about 61%–67% mullite and about 33%–39% unstabilized zirconia.

3. A refractory pouring tube of the type employed in casting molten metal from a melt thereof wherein the molten metal is passed through the tube and discharged into a mold, the pouring tube including a fired tubular member having its interior surface for contact with the flowing metal, the tubular member being characterized by a composition comprising a fused refractory aggregate consisting essentially by weight of about 42–48 percent alumina and 17–23 percent silica generally in the form of mullite, and about 33–39 percent unstabilized zirconia; and a refractory binder material consisting of 50%–20% by weight of the article for bonding the aggregate together, said binder before firing consisting essentially of 100 mesh zircon sand 10 to 90%, 325 mesh alumina 10 to 90% and clay 0 to 50% with organic lubricating materials thermally removed during firing; the aggregate comprising by weight about 50–80 percent of the tubular member.

4. The refractory pouring tube of claim 3, wherein the crystaline structure of the aggregate includes by weight about 61%–67% mullite and about 33%–39% unstabilized zirconia.

References Cited

UNITED STATES PATENTS 3,359,124  12/1967  Henry _____ 106—57

FOREIGN PATENTS 872,304  7/1961  Great Britain _____ 106—57

JAMES E. POER, Primary Examiner

U.S. Cl. X.R.

106—65